(12) United States Patent
Zierold

(10) Patent No.: US 8,940,124 B2
(45) Date of Patent: Jan. 27, 2015

(54) PROCESS AND APPARATUS FOR PRODUCING A DECORATED PLATE COATED ON BOTH SIDES

(75) Inventor: Ulrich Zierold, Fruthwilen (CH)

(73) Assignee: Surface Technologies GmbH & Co. KG, Baruth (DE)

( * ) Notice: Subject to any disclaimer, the term of this patent is extended or adjusted under 35 U.S.C. 154(b) by 13 days.

(21) Appl. No.: 13/518,670

(22) PCT Filed: Dec. 23, 2010

(86) PCT No.: PCT/EP2010/070636
§ 371 (c)(1),
(2), (4) Date: Aug. 22, 2012

(87) PCT Pub. No.: WO2011/076916
PCT Pub. Date: Jun. 30, 2011

(65) Prior Publication Data
US 2012/0318453 A1    Dec. 20, 2012

(30) Foreign Application Priority Data

Dec. 23, 2009 (DE) .......................... 10 2009 060 218
Jun. 30, 2010 (DE) .......................... 10 2010 030 752

(51) Int. Cl.
*B32B 37/02* (2006.01)
*B32B 37/12* (2006.01)
*E04F 15/02* (2006.01)
(Continued)

(52) U.S. Cl.
CPC ............. *E04F 15/02* (2013.01); *B32B 21/02* (2013.01); *B32B 21/06* (2013.01); *B32B 29/06* (2013.01); *B44C 5/0469* (2013.01); *E04F 15/181* (2013.01); *E04F 2290/043* (2013.01)

USPC .......................................... 156/279; 156/390

(58) Field of Classification Search
CPC ........................................................ B32B 21/12
USPC ....................................... 156/280, 279, 307.1
See application file for complete search history.

(56) References Cited

U.S. PATENT DOCUMENTS 5,141,583 A    8/1992   Held
5,149,394 A    9/1992   Held
(Continued)

FOREIGN PATENT DOCUMENTS

DE         101 56 956 A1      6/2003
DE     10 2007 026 170 A1    12/2008
(Continued)

OTHER PUBLICATIONS

Abstract of RU2297909; Apr. 27, 2007.

*Primary Examiner* — Michael Orlando
*Assistant Examiner* — Marta Dulko
(74) *Attorney, Agent, or Firm* — Senniger Powers LLP

(57) ABSTRACT

In the production of decorated plates coated on both sides, the supporting material has to be provided with the coatings for the top side and the bottom side in a plurality of passes. This is simplified significantly by firstly coating both sides with a liquid glue, applying webs of the decorative paper or, if appropriate, of a backing paper or of a nonwoven to these layers, applying, after the glue has dried, a pulverulent composition comprising a resin which can be melted and cured by heating to the top side of the first web on the top side of the plate, partially melting or melting this composition and finally curing the glue and resin composition under pressure and heat.

8 Claims, 1 Drawing Sheet

(51) Int. Cl.
  *B32B 21/02* (2006.01)
  *B32B 21/06* (2006.01)
  *B32B 29/06* (2006.01)
  *B44C 5/04* (2006.01)
  *E04F 15/18* (2006.01)

(56) References Cited

U.S. PATENT DOCUMENTS

| | | |
|---|---|---|
| 5,466,511 A | 11/1995 | O'Dell et al. |
| 8,366,854 B2 * | 2/2013 | Buhlmann .................. 156/235 |
| 8,445,060 B2 * | 5/2013 | Nasatti et al. ................. 427/202 |
| 2003/0059639 A1 * | 3/2003 | Worsley ..................... 428/537.1 |
| 2010/0055420 A1 | 3/2010 | Vermeulen |
| 2010/0239820 A1 * | 9/2010 | Buhlmann ..................... 428/172 |
| 2010/0307677 A1 * | 12/2010 | Buhlmann ..................... 156/277 |

FOREIGN PATENT DOCUMENTS

| | | | |
|---|---|---|---|
| DE | 102007062600 A1 * | 6/2009 | .............. B32B 38/14 |
| GB | 2446587 | 8/2008 | |
| JP | H10138438 A | 5/1998 | |
| RU | 2297909 C2 | 4/2007 | |
| WO | 2009/080772 A1 | 7/2009 | |

* cited by examiner

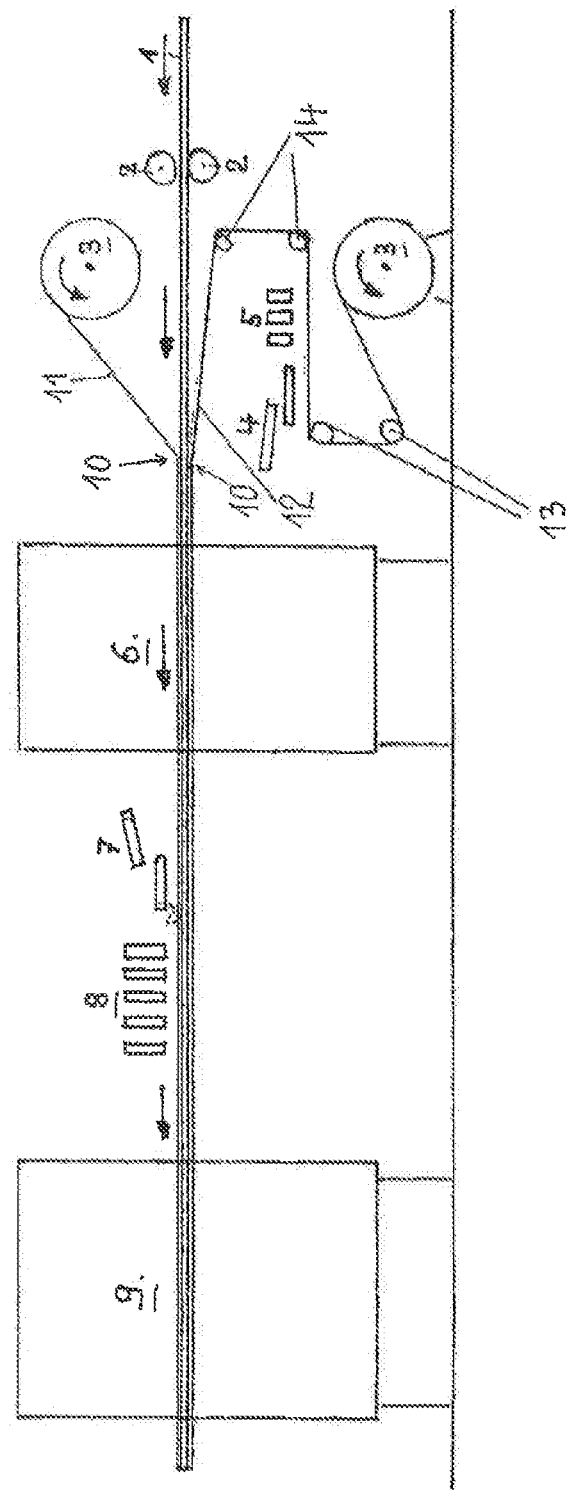

PROCESS AND APPARATUS FOR PRODUCING A DECORATED PLATE COATED ON BOTH SIDES

CROSS-REFERENCE TO RELATED APPLICATIONS

This application is a 371 of PCT/EP2010/070636 filed Dec. 23, 2010, which in turn claims the priority of DE 10 2009 060 218.6 filed Dec. 23, 2009 and DE 10 2010 030 752.1 filed Jun. 30, 2010, the priority of these applications is hereby claimed and these applications are incorporated by reference herein.

The present invention concerns a process and an apparatus for producing a decorated plate or board coated on both sides.

Such plates or boards are used in many different situations, for example as floor elements, wall cladding and furniture panels. They essentially comprise a carrier, for example a board of a wood material such as chipboard or fibre board, with a decorative paper which is applied by lamination at least on one side and which is coated with a protective layer of a synthetic resin. To solidify that protective layer which often consists of an aminoplast it is subjected under pressure and heat to hardening by condensation and crosslinking reactions. To compensate for stresses in the laminate layer which could lead to deformation of the laminated board a layer is generally also applied by lamination on the other side of the carrier. That so-called backing layer can be a simple non-woven material such as for example paper. In the case of floor panels that layer can also be in the form of footstep sound damping. Desirably for use in the production of articles of furniture both sides of the carrier are laminated with a decorative layer. Other natural materials such as solid wood or stone are frequently imitated by the decorative layer. In that respect it has become the usual practice to emboss into the outer surface of the protective layer a relief which corresponds to the imitated material, for example by means of a surface-structured pressing plate, during the hardening procedure.

In a widespread process the decorative paper is impregnated with a resin prior to lamination on to the carrier. In that case however its dimensions change so that particular measures are necessary to bring the relief embossed into the protective layer into conformity with the representation on the decorative paper. It is known from patent application DE 10 2007 026 170 A to use a non-impregnated decorative paper and to lay it on a layer of liquid glue, which was previously applied to the carrier. In that case the paper absorbs the glue so that its pores are filled as in the impregnation operation, but it retains its dimensions and thus remains in register relationship with the surface structure of the pressing plate. After fixing of the decorative paper a protective layer can be applied over the decorative paper, with or without a non-woven carrier material (generally comprising cellulose).

However the carrier plate still has to be treated prior to definitive hot-pressing and hardening of the resin constituents in two separate working steps for the top side and the underside respectively.

The object of the present invention is to further simplify the process for producing a decorative plate or board which is coated on both sides and in particular to design it in such a way that the layers provided on the top side and the underside can be applied in one working step, and also to provide an apparatus for carrying out such a process.

That object is attained by a process according to claim 1 and an apparatus according to claim 10.

Because the liquid glue forms a uniform layer which adheres for a certain time not on the top side of the carrier but also on its underside, a respective web material can be fixed on both sides in one passage of the carrier to such an extent that it withstands the further transport operations without adverse effect. So much glue can be applied that the web material is impregnated with the glue on both sides. In that case, there is no longer any change in the dimensions of the web material. The binding of the web material to the carrier is further consolidated in the drying step. Finally, to prepare the protective layer, a hardenable resin composition in powder form is scattered on to the first web on the top side of the carrier and at least partially melted or sintered by heating. In that condition, the product of carrier and coatings is transferred into a heatable press where hardening of the glue and the resin composition are effected under pressure and heat. In that way, a product which is ready for further processing is produced in one pass.

As an alternative to scattering a powder on the first web and melting or fusing it is also possible for a pasty composition to be applied to the web laid on the carrier, which composition contains the constituents of such a first composition in powder form and water. Such a pasty composition can be obtained both by concentrating an aqueous solution with the constituents of such a first powder and also by mixing a first powder composition with water, with agitation. The viscosity of the paste is to be so adjusted that the paste does not flow off the web prior to drying. Preferably the pasty composition has a solids content of at least 85 percent by weight.

For example fibre boards (MDF or HDF) and chipboards are suitable as the carrier material. The boards can be supplied individually, wherein the first and second webs are respectively appropriately cut to size. However a continuous mode of operation is also possible if the boards are supplied without an intermediate space or an endless board is used directly from the board-making machine.

The liquid glue is for example an aqueous composition with initial stages of a melamine or urea glue and a suitable hardener, for example an acid component. The glue is suitably selected such that the temperature required for hardening thereof is higher than the drying temperature used. Then hardening is effected by cross-linking or condensation only in the heated press. The viscosity of the glue is desirably so adjusted that no formation of non-honogeneities or any drops at all occurs in the time prior to application of the glue until application of the web, even on the underside of the carrier. On the other hand the viscosity adjustment is to be taken into account such that the web material is sufficiently impregnated, that is to say saturated, until it passes into the drying step. A different (for example lower) viscosity can optionally be set for the first web, than for the second web.

Known processes can be used for applying the glue to the carrier, for example roller application, possibly with engraved or patterned rollers, brushes, absorbent pads and the like.

While application of the first web can basically be effected solely by the force of gravity, the second web has to be brought into contact with the glue layer on the underside of the carrier by a suitable applicator apparatus. That can be for example a roller or a flexible doctor or squeegee. For better control of the application procedure, it is preferable if the first web is also applied to the layer of glue on the top side of the carrier by means of such an apparatus.

After both webs have been applied to the top side and underside of the carrier board the layer assembly produced in that way is dried. For that purpose it can be passed through a suitable drying oven in which it is exposed to heated dry air. Preferably infrared radiation or high frequency is used for the drying operation, which is possible even without a particular oven. Preferably in that case the layer assembly is not heated to such an extent that the glue already hardens completely.

In the next step in the process a powder composition with a resin which can be melted and hardened by heating and/or constituents which can react to form such a resin is applied to the first web on the top side of the carrier board. That composition is later to form the cover layer of the laminate. It includes one or more thermally hardenable resins, preferably from the groups of amino resins and/or phenolic resins. Epoxy and acrylic resins can also be used. If necessary it also includes one or more initiators and/or catalysts (hardeners) for thermal hardening. Preferred resins are urea-formaldehyde resins, melamine resins, phenol-formaldehyde resins. Alternatively or additionally to such resins the composition can also contain substances representing preliminary stages for those resins such as melamine, urea, phenol, formaldehyde (for example in the form of paraformaldehyde or trioxane) and derivatives thereof. If need be the powder compositions which can be used according to the invention contain small proportions of water and can be obtained for example by drying suitable usual solutions of their constituents.

The particle size of the powder composition is below one millimeter, preferably between 0.1 μm and 0.5 mm.

The powder composition can contain further constituents as are known for improving the properties of the cover layer. They include in particular hard solids for increasing abrasive wear resistance such as corundum, silicon carbide, silicon dioxide, glass particles, pyrophyllite, reinforcing fibres, for example of cellulose, other usual additives for plastic materials such as stabilisers, brighteners, UV absorbers, fillers of organic and inorganic nature, additives for optical effects such as metallic effect, pearl sheen, opalescence, wetting agent, separating agent, flow additive, bonding additive. An addition of cellulose fibres and/or glass beads which are larger than the particles of the hard solids can reduce the wear of the pressing plates and belts due to those solids.

Known scattering apparatuses can be used for applying the powder composition. It is also possible for the scattering operation to be carried in two or more steps in order to improve the uniformity of the layer applied by scattering and/or to smooth the powder layer, for example with a doctor. Alternatively the powder composition can also be applied by using electrostatics in accordance with a direct process derived from powder lacquering or also indirectly by transfer of a layer produced on a photoelectric drum.

The applied amount of powder composition depends on the intended thickness of the cover layer. In general applications of between 1 and 200 $g/m^2$ are appropriate.

The carrier with the powder layer produced in that way is then heated to melt the powder. In that case the powder can be completely melted or also only initially melted, partially melted or sintered if the molten material is to be prevented from flowing away. On the other hand the powder layer must be compacted to such an extent that in the subsequent pressing operation no bubbles remain behind and can make the layer dull and cloudy. The melting temperature depends on the composition of the resin mixture and can advantageously be between 5 and 150° C.

Generally temperatures up to about 120° C. are sufficient for initial melting. To avoid unwanted flow of the molten resin powder the layer can thereafter be solidified or hardened again by cooling.

A suitable heat source for initial melting of the powder layer is infrared radiating devices, microwaves or even flames if it is possible to avoid the powder being swirled up thereby.

After initial melting or melting of the powder layer the carrier with the composite layer arrangement is transferred into a press and pressed at elevated temperature. In that case on the one hand compacting of the powder layer is effected while on the other hand this involves hardening of the glue and the resin of the cover layer. In that case, a relief can be produced in the cover layer in known manner by using structured pressing plates. The temperature of the layers in the pressing operation is about 150 to 200° C., preferably 160 to 180° C. Because of the relatively short residence time of the composite layer arrangement in the press the pressing plates have to be considerably hotter, for example by 30 to 50 K. The applied pressure is suitably between 2.5 and 10, preferably between 4 and 6 MPa.

In a preferred embodiment of the process according to the invention a layer comprising a powder composition with a resin which can be melted and hardened by heating is also applied on the second web for forming a cover layer. This can involve the same composition as that applied to the first web. It is however also possible to use a different composition if the two compositions afford the respectively desired properties under the conditions of the joint pressing operation which takes place at the end. Application of the powder layer to the second web is effected before that web is laid on the underside of the carrier board, more specifically on the downwardly facing side of the web, that is remote from the carrier board after the web application operation. It is therefore necessary for that web to be turned after scattering of the composition thereon and prior to application thereof. In order to avoid a part of the powder falling off the web in that case, it is desirably initially melted or sintered or also completely melted prior to the turning operation by being heated, and sufficiently solidified by cooling again for the following steps. It is possible for that purpose to use the same processes as described hereinbefore for initial melting or sintering of the corresponding layer on the first web.

As an alternative thereto a pasty aqueous composition with the constituents of the first or a second powder composition can be applied to the second web prior to application to the glue layer on the underside of the carrier. That can also be effected from the underside of the second web if the pasty composition is so adjusted that it sufficiently adheres to the second web. As deflection steps may still be necessary thereafter prior to application to the underside of the carrier, the pasty composition is preferably dried after the application operation, jointly with the glue layer. Deflection is preferably effected in contact-less fashion.

In a preferred embodiment a decorative paper is used as the first web. That decorative paper is generally not impregnated. The second web can then for example also be a decorative paper if a structural panel for an article of furniture is wanted, a backing paper or also a non-woven material or a film with a capability of damping footstep sound. Such web materials are known per se and for example comprise non-woven materials comprising synthetic or natural fibres, synthetic foams or natural materials such as cork.

Alternatively the first web can also be a single-coloured non-woven material, in particular a single-coloured paper, on which the decoration is produced by a printing process in accordance with the DE, preferably after the application and drying operations.

The invention also includes an apparatus for carrying out the process according to the invention. That apparatus includes at least a feed and conveyor apparatus which feeds the carrier, preferably substantially in a horizontal plane, to the further parts of the apparatus, and conveys it therethrough, applicator devices for the liquid glue above and below the carrier plane respectively, unwinding stations for the first and second webs above and below the carrier plane respectively, applicator devices for the second web below the carrier plane and optionally for the first web above the carrier plane, a drying device, a scattering and heating device above the carrier plane and a heatable pressing device.

The feed and conveyor device can be of a known structure, for example in the form of a roller or roll track. As the layers on the underside of the carrier board can be contact-sensitive, for example after the second web is applied to the wet glue, roller or gripping devices can also be provided region-wise only for the edge region of the carrier board.

The applicator devices used can be known devices such as for example applicator rollers, possibly with an engraving/patterning or a doctor or squeegee to increase or control the application weight, rollers provided with pads or brushes, or spraying devices.

The unwinding stations can be so arranged that they provide the first web above the carrier plane and the second web beneath the carrier plane. They can be equipped with the usual means for regulating for example the web tension and the lateral edge motion.

The applicator devices are intended to ensure that the webs are uniformly placed into the layer of liquid glue. They can be for example in the form of pressure applicator rollers or flexible doctors. Desirably they are disposed at the smallest possible spacing relative to the respective applicator device.

The drying device includes means for heating the glue-saturated webs and possibly for removing the evaporated moisture. Drying can be effected for example by a heated air flow, by infrared radiation or by high frequency or microwaves. It may be desirable for the drying device to be in the form of a substantially closed region in order to keep environmental influences away. The apparatus can be provided with means for measuring the residual moisture content and for controlling the heating means.

Provided downstream of the drier is a scattering device for the first powder composition. Known apparatuses can also be used for that purpose such as for example shaking screens, belt scattering devices and vibration scattering devices. It is also possible for a plurality of identical or different devices to be arranged in succession to improve the uniformity of application. The scattering device can also have means for evening out the layer applied by scattering, for example a doctor.

In an alternative embodiment the apparatus according to the invention, instead of the scattering station, has an applicator device for a pasty composition. That can be for example an applicator roller with a doctor for adjusting the application weight. That applicator station can be arranged both upstream of and also downstream of the drier. In the latter case, instead of the heating station, a drying station is required. In order to be able to operate flexibly with the apparatus, it is also possible at that point to use an apparatus which depending on the respective process being carried out can operate as a heating station for initial melting and also as a drying station.

In addition the apparatus according to the invention has means for heating the scattered powder layer. That can be for example infrared radiating devices, microwave radiating devices, or tunnel furnaces heated with current or gas.

Finally the apparatus according to the invention also includes a heatable press. That can be for example a short-cycle press if the apparatus is intended for processing individual boards. To produce a relief in the cover layer of the decorated plate or board the press can be provided with pressing plates provided with a surface structure, Double-belt presses, optionally with smooth or surface-structured pressing belts, are also suitable both for individual boards and also for continuous carrier boards.

A further preferred embodiment of the apparatus according to the invention also includes a second scattering and heating station arranged beneath the carrier plane beneath the unwinding station for the second web and the corresponding applicator device. It can have the same or similar means for scattering the composition and heating it as the above-described first scattering and heating station. As in this case however the side of the second web, that faces downwardly after application to the carrier board, has to have the composition applied thereto by scattering, further means are required for turning the web. These can be deflection rollers provided between the unwinding station and the scattering device and between the heating device and the applicator device. As the surface of the powder which is applied by scattering and which is initially melted can be sensitive, it is also possible to use contact-less deflection means such as for example an airturn means in accordance with DE 4415581. Additionally or alternatively one of the deflection rollers can be cooled to solidify the initially melted powder.

Alternatively the apparatus according to the invention, instead of the second scattering and heating station, includes a second applicator station for a paste. That can be of a configuration like the above-described first applicator station.

The process according to the invention permits a considerable simplification in the production of decorated boards. That also signifies a reduction in the size of the required apparatuses, with a corresponding reduction in capital investment volume. As the material for the cover layer is used substantially water-free, the energy previously used for the drying operation can be saved. No circulating and processing system is needed for decorative layer materials which are to be applied in liquid form. That therefore also involves fewer startup losses in terms of solution and carrier material in the event of interruptions in operation. Storage and stockkeeping of intermediate products such as impregnated decorative paper, overlay and boards processed on one side become redundant and the capital linked thereto is reduced. Because no overlay bound to cellulose is now required the clearness and brilliance of the decoration can be improved. An adverse effect on clearness due to residual moisture in the cover layer after the pressing operation is also avoided. Abrasive wear-reducing and other additives can be incorporated in the cover layer without involving non-homogeneities due to mixture separation or wear at the applicator devices.

An example of an apparatus according to the invention and the functioning thereof in performing the process according to the invention is illustrated diagrammatically in FIG. 1 of the accompanying drawing. Carrier boards 1 are conveyed by a feed and conveyor device (not shown) through the applicator device where they are coated with liquid glue on the top side and the underside by applicator rollers 2. At 10 the first and second webs 11 and 12 are placed by rollers (not shown) in the glue layers on the top side and underside of the carrier board. That composite layer arrangement passes into a drier 6 which here is closed and where the glue is dried to the desired residual moisture content. The first powder composition is applied by scattering with the scattering device 7 to the first web which is now fixed to the carrier board and is caused to sinter or melt with infrared radiating devices 8. Finally the carrier board passes into the press 9 where the layers applied by lamination are hardened under pressure and heat and possibly provided with a relief. If the second web on the underside of the carrier board is also to be provided with a cover layer a further scattering device 4 and infrared radiating device 5 are arranged between the unwinding station 3 and the lower applicator station 10. For that purpose the web is turned by means of the deflection rollers 13 so that after the lamination operation it has its downwardly facing layer upwards and can have the composition scattered thereon. After the scattering operation and initial melting the web is turned by the deflection rollers 14 again and fed to the applicator station 10.

The invention claimed is:

1. A process for producing a decorated board coated on both sides, including the steps:
   a) coating a carrier material on the top side and the underside with a liquid glue which can be hardened by heating,
   b) applying a first web of paper or non-woven material to the glue layer on the top side of the carrier material,
   c) applying a first or a second powder composition comprising a resin to an upward facing surface of a second web of paper, non-woven material, or film, initially melting or melting the applied first or second powder composition to form a second web molten or initially molten layer, solidifying the second web molten or initially molten layer, and turning the second web so that its upward facing layer faces downward, then applying said second web of paper, non-woven material or film to the glue layer on the underside of the carrier material,
   d) drying the glue by heating the layer assembly produced by steps a)-c),
   e1) applying to the top side of the first web the first powder composition with a resin which can be melted and hardened by heating and/or constituents which can react to form such a resin,
   f1) initially melting or melting the powder layer on the first web to form a first web molten or initially molten layer and subsequently solidifying the first web molten or initially molten layer by cooling, and
   g) hardening the glue and the resin composition under pressure and heat.

2. A process according to claim 1 wherein the applying the first or the second powder composition to the upward facing surface of the second web of paper comprises applying the second powder composition which differs from the first powder composition applied to the first web.

3. A process according to claim 1 wherein a decorative paper is used as the first web.

4. A process according to claim 3 wherein a decorative paper, a backing paper or a non-woven material or a footstep sound damping film is used as the second web.

5. A process according to claim 1 wherein a melamine or urea glue is used as the liquid hardenable glue.

6. A process according to claim 1 wherein the resin compositions used contain a melamine, phenolic, urea, acrylic or epoxy resin and/or preliminary stages of a melamine, phenolic, urea, acrylic or epoxy resin and hardeners suitable for same.

7. A process according to claim 1 wherein the resin compositions contain particles of a hard material and/or cellulose fibres.

8. A process according to claim 7 wherein the particles comprise aluminium oxide, silicon dioxide, silicon carbide, titanium dioxide, glass or pyrophyllite.

* * * * *